(No Model.)
J. SCHEFFLER.
DENTAL IMPRESSION CUP.
No. 401,792. Patented Apr. 23, 1889.
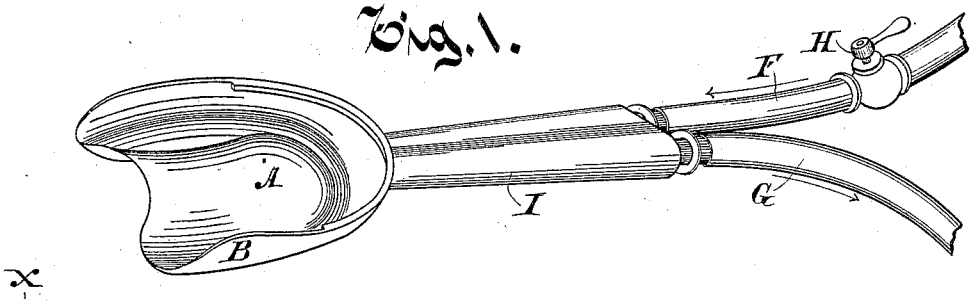
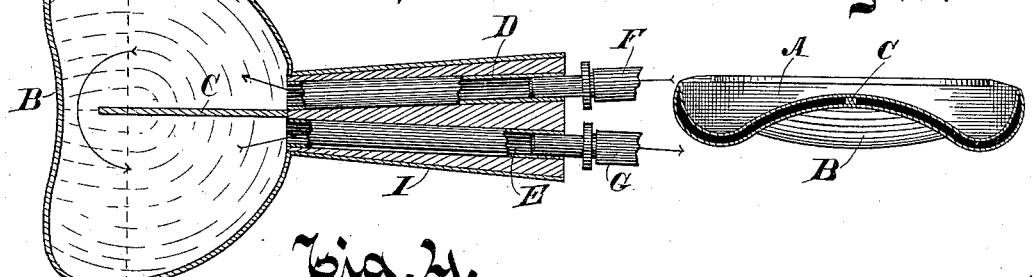
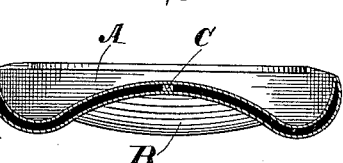
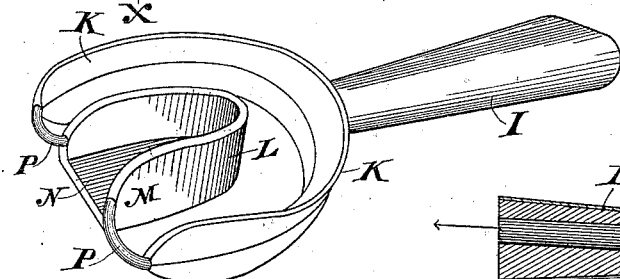
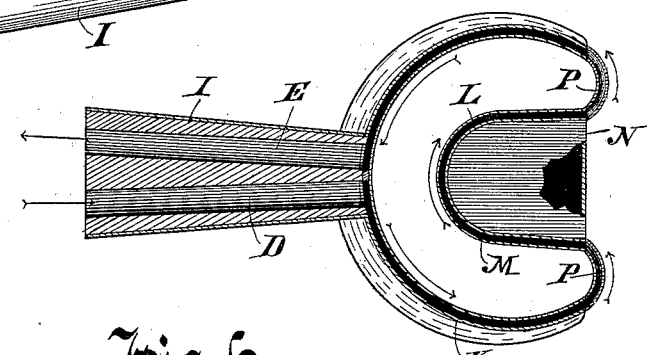
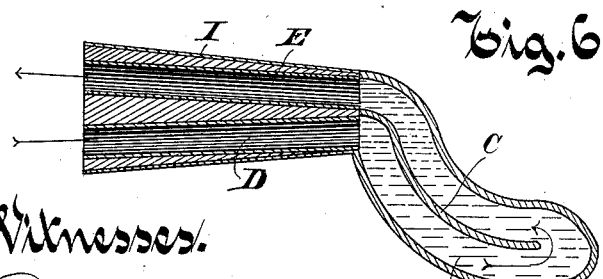
Witnesses:
O. H. Keeney.
Anna Faust.
Inventor.
Julius Scheffler
By Erwin & Benedict
Attorneys.

UNITED STATES PATENT OFFICE.

JULIUS SCHEFFLER, OF MILWAUKEE, WISCONSIN.

DENTAL IMPRESSION-CUP.

SPECIFICATION forming part of Letters Patent No. 401,792, dated April 23, 1889.

Application filed March 8, 1888. Serial No. 266,579. (No model.)

*To all whom it may concern:*

Be it known that I, JULIUS SCHEFFLER, of Milwaukee, in the county of Milwaukee and State of Wisconsin, have invented new and useful Improvements in Dental Impression-Cups; and I do hereby declare the following to be a full, clear, and exact description of said invention, reference being had to the accompanying drawings, and to the letters or figures of reference marked thereon, which form a part of this specification.

My improved impression-cup is designed and adapted for taking the form of the mouth with any plastic material capable of receiving the impression and forming a matrix, which material hardens or sets quickly by change of temperature, and is especially adapted for use with a plastic material applied and used at a high temperature, but which sets or hardens quickly on being cooled or when the temperature is considerably reduced by contact with a cooling medium.

In the drawings, Figure 1 is a perspective view of my improved impression-cup, and the attachments thereto show the method of using it. Fig. 2 is a lateral section of the cup shown in Fig. 1, showing the interior of the cup and its handle. Fig. 3 is a vertical transverse section of the cup on line X X of Fig. 2. Fig. 4 is a view of the under side of a modified form of my improved cup adapted for taking an impression of either the upper or lower part of the mouth, or both, at the same time. Fig. 5 is a central lateral section of the cup shown in Fig. 4, a part being broken away to exhibit the interior. Fig. 6 is a form of my improved cup adapted for taking the impression of one side of the mouth only.

The same letters refer to like parts in all the views.

My impression-cup is constructed hollow, having an inner wall, A, and an outer wall, B, forming a chamber within the cup, which is preferably divided into two parts by a vertical partition, C. A tube is secured to the outer wall, B, providing a receiving-duct, D, for the inflow of water or other fluid into the chamber of the cup. Another tube is attached to the outer wall, B, opening into the chamber of the cup on the other side of the partition C, forming a discharge-duct, E, for the outflow of the water or liquid from the chamber or chambers of the cup. These tubes are conveniently located in a handle of the cup I. A flexible tube, F, preferably of rubber, is secured at one end water-tight in the outer end of the duct D, which tube F leads away to the water-supply, which may conveniently be a tank or reservoir of water located in the upper part of the room or chamber above that in which the operator is at work. A stopcock, H, is located in the tube F at a point convenient for manipulation, whereby the flow of the water into the chamber of the cup may be regulated or stopped. A discharging-tube, G, is secured in the duct E, whereby the water that is allowed to flow into the chamber through the duct D is at once discharged therefrom.

The method of using this cup is to fill it properly with a sufficient supply of the plastic material for receiving the impression, and when the cup so loaded has been placed in the mouth and moved to proper position for taking the impression, water is admitted to the chamber or chambers of the cup through the duct D, whereby the temperature of the plastic material is quickly changed and it sets or hardens at once. I preferably use a material which when quite warm is sufficiently plastic for taking the impression properly, and which, under the change of temperature caused by the introduction of cold water into the chamber or chambers of the impression-cup, immediately sets or hardens, forming a substantial and reliable matrix.

It will be seen that the form of the chambers is such as to cause the water to flow along and about the outer rim of the cup as well as through other parts of it, whereby all parts being freely supplied with water are kept at the uniform temperature of the water and the plastic material is quickly cooled or set.

The form of cup shown in Fig. 4 is constructed with an outer chamber, K, which is of a form and shape to enter the mouth and encircle the teeth or jaws on the outside, and an inner chamber, L, having a wall, M, to encircle the end of the tongue, and a top plate, N, covering the end of the tongue, which inner chamber, L, is connected with the outer chamber, K, on both sides by the rigid tubes P P only, the inner chamber being nowhere else connected with the outer chamber, and the wall of the inner chamber being at all points at so great a distance from the wall of the outer chamber as to permit the teeth of the upper and of the lower jaw to come together in the space between the two chambers. The wall M and the top plate, N, are both hollow, forming a water-chamber. This form of construction permits the water to flow freely through both outer and inner chambers, as will be understood by reference to Fig. 5. The modified or half-cup form shown in section in Fig. 6 is also constructed to permit the free flowing of water therethrough, as will be clearly seen by reference to the drawings.

When the form of cup shown in Fig. 4 is used, the plastic material is placed in the space between the outer chamber, K, and the inner chamber, L, and the cup being properly inserted in the mouth and the teeth closed into the plastic material a matrix will be obtained of both the upper and lower parts of the mouth, which can be used for both or either, as desired.

What I claim as new, and desire to secure by Letters Patent, is—

A dental impression-cup consisting of two sheet-metal water-holding chambers, the outer one being so formed as to encircle the jaw and teeth, and the inner one being so formed as to encircle the tongue within the jaw and teeth, the two chambers being connected at their inner ends by water-conveying pipes, and being otherwise unconnected and located so far from each other that the teeth of the upper and of the lower jaw may come together from above and below in the space between said chambers, the outer chamber having a water-receiving and a water-discharging duct leading into and from said outer chamber, one on each side of a vertical partition in said outer chamber, substantially as described.

In testimony whereof I affix my signature in presence of two witnesses.

JULIUS SCHEFFLER.

Witnesses:
    GEO. STEUBER,
    C. T. BENEDICT.